J. R. PEIRCE.
DISTRIBUTING MACHINE.
APPLICATION FILED JAN. 10, 1911.

1,316,461.

Patented Sept. 16, 1919.
11 SHEETS—SHEET 1.

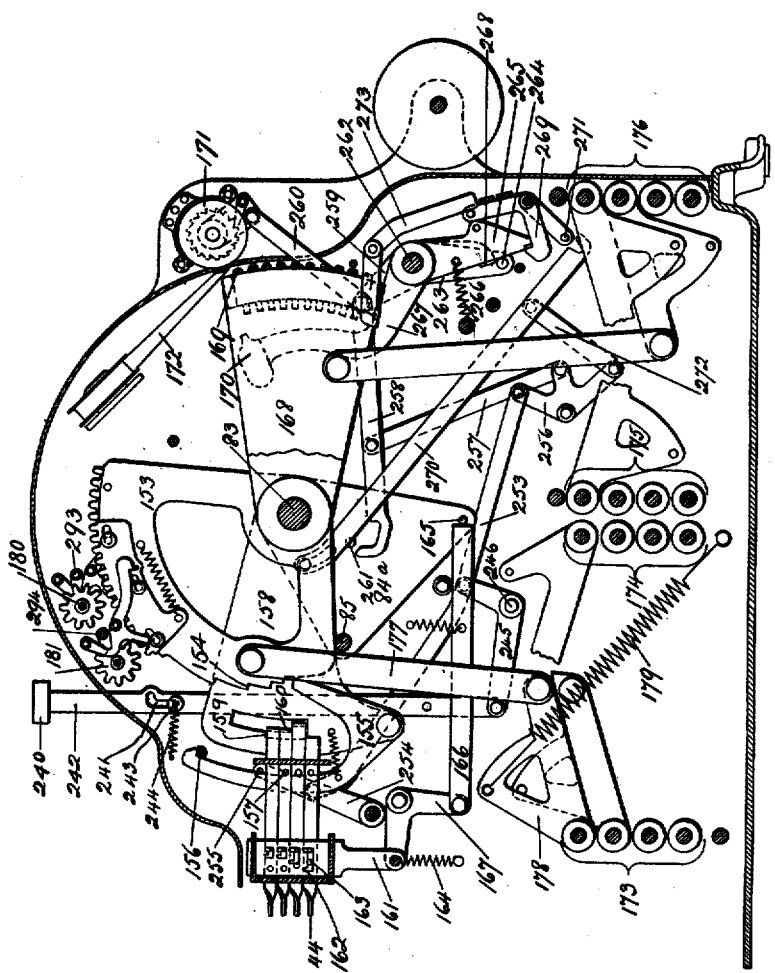

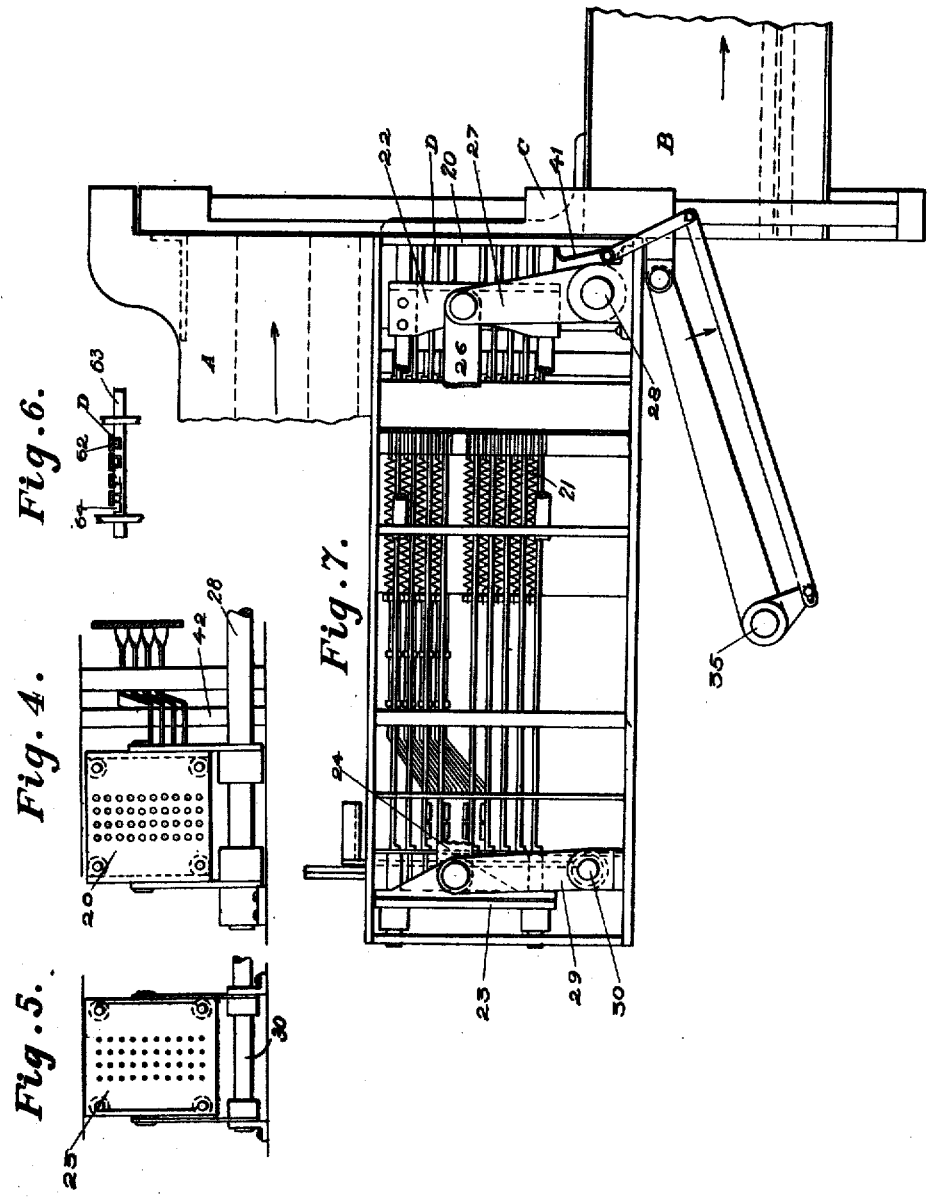

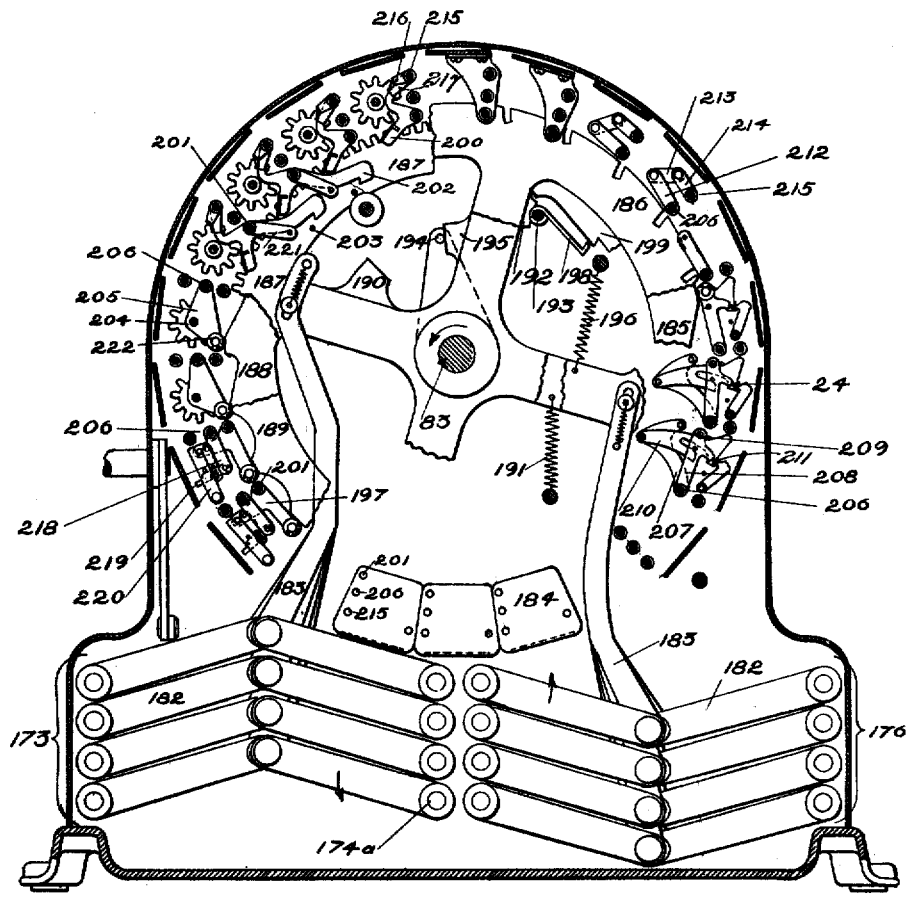

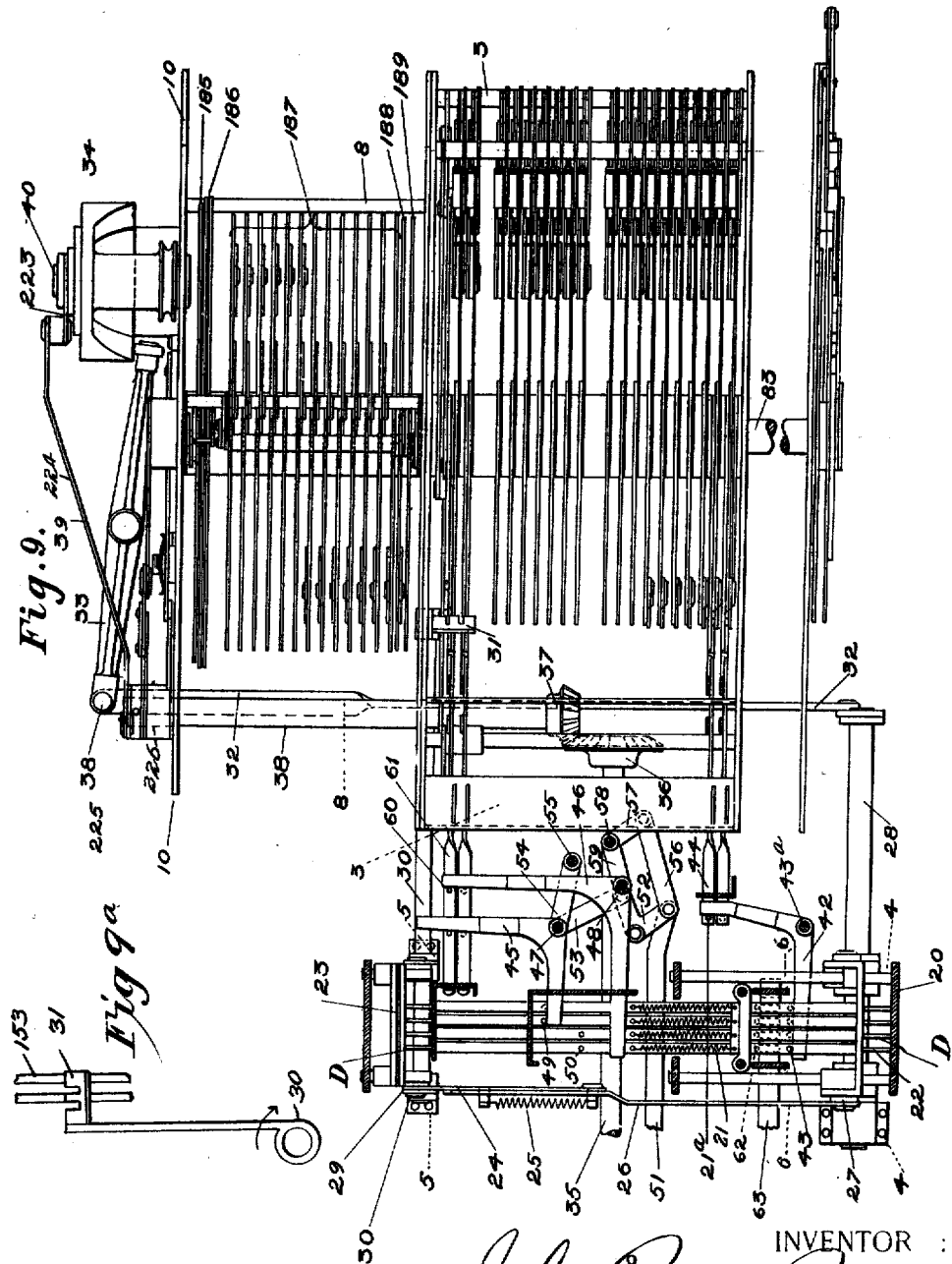

J. R. PEIRCE.
DISTRIBUTING MACHINE.
APPLICATION FILED JAN. 10, 1911.
1,316,461.
Patented Sept. 16, 1919.
11 SHEETS—SHEET 7.
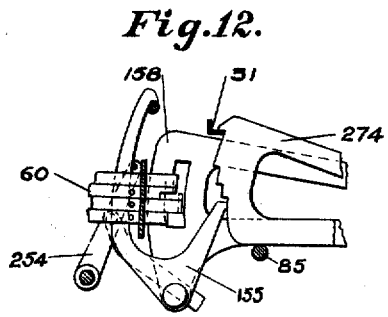
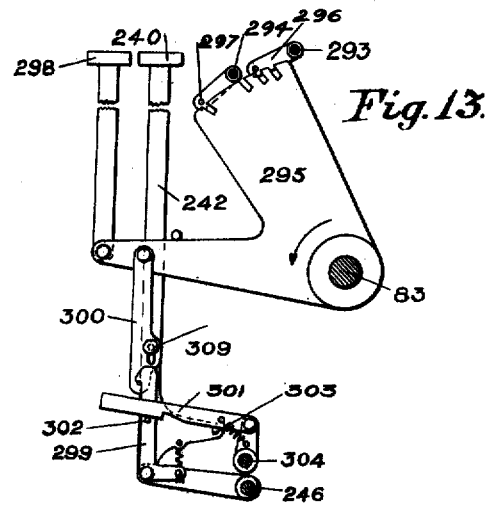
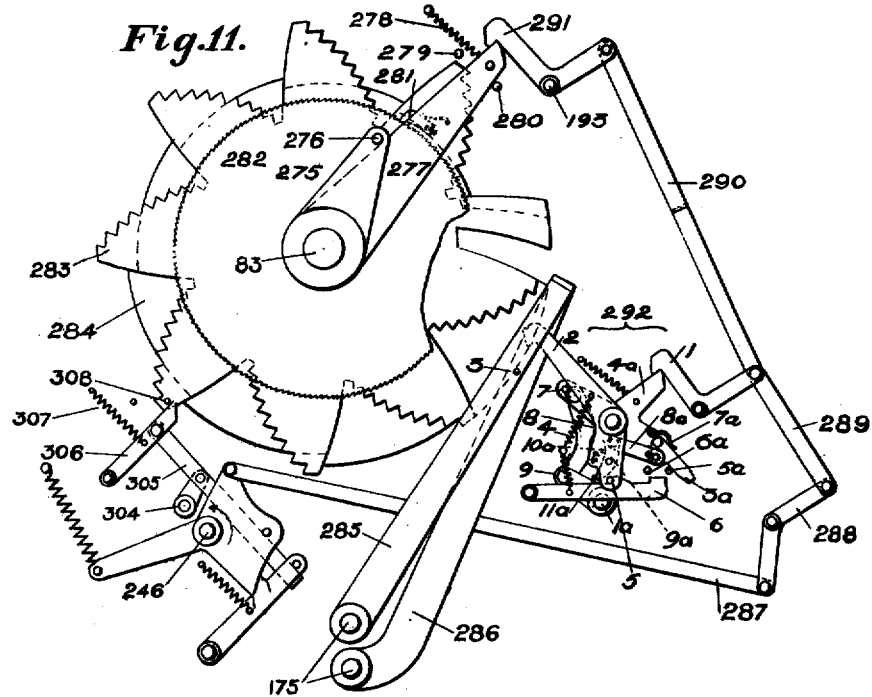

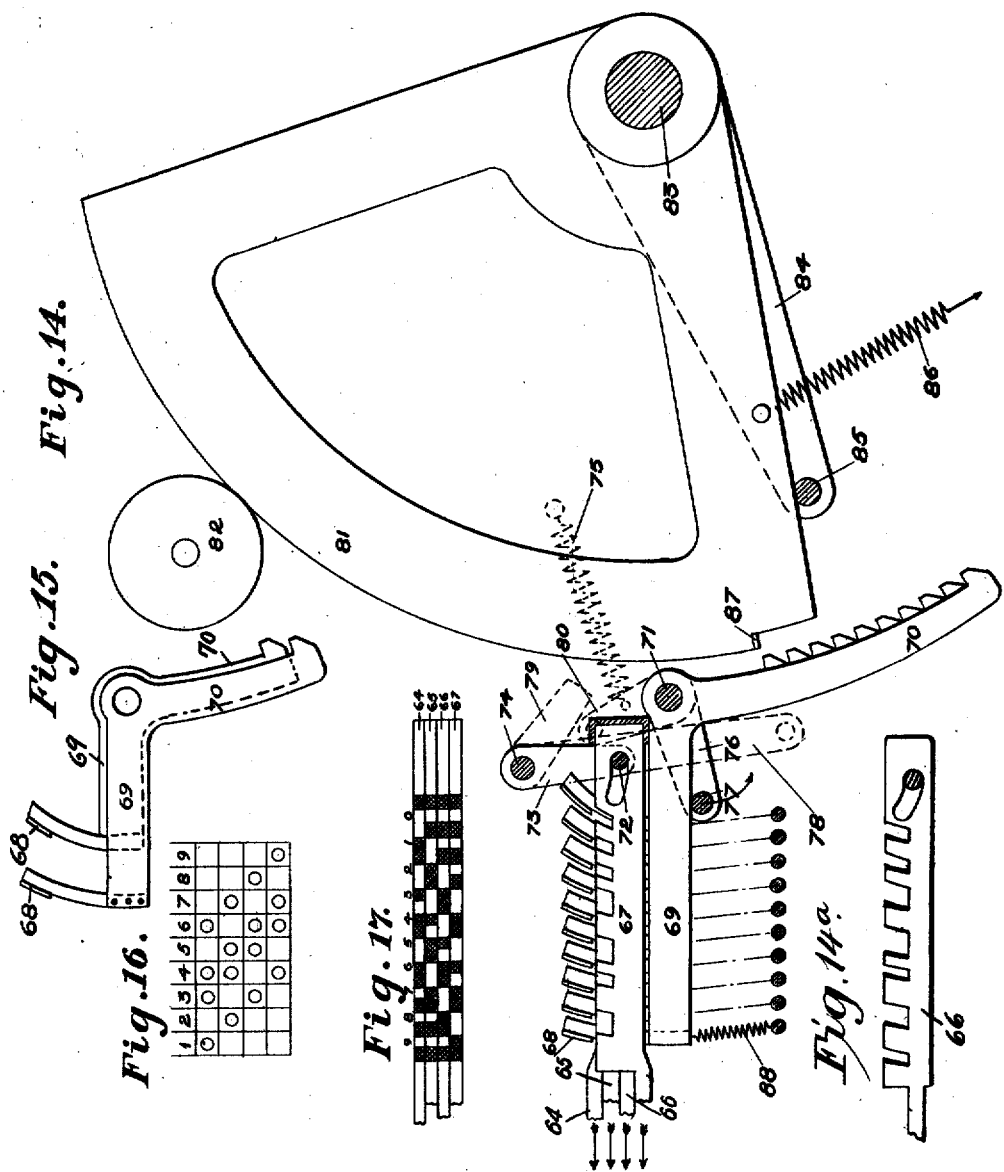

J. R. PEIRCE.
DISTRIBUTING MACHINE.
APPLICATION FILED JAN. 10, 1911.
1,316,461.
Patented Sept. 16, 1919.
11 SHEETS—SHEET 9.
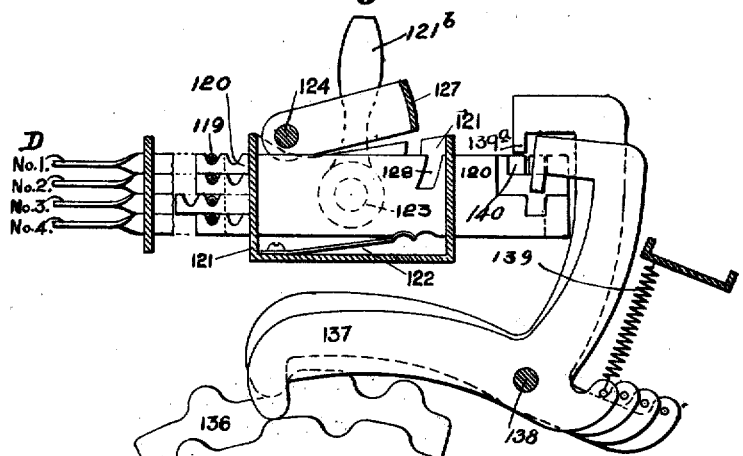
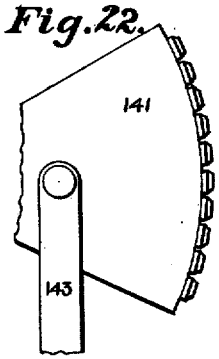
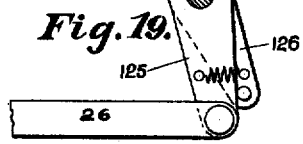
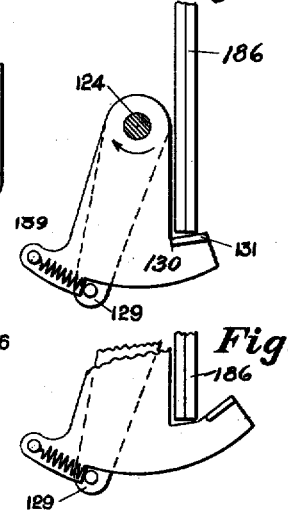
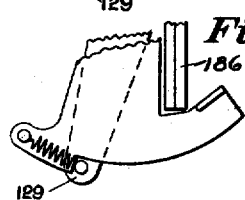
WITNESSES:
INVENTOR:
By Attorneys,

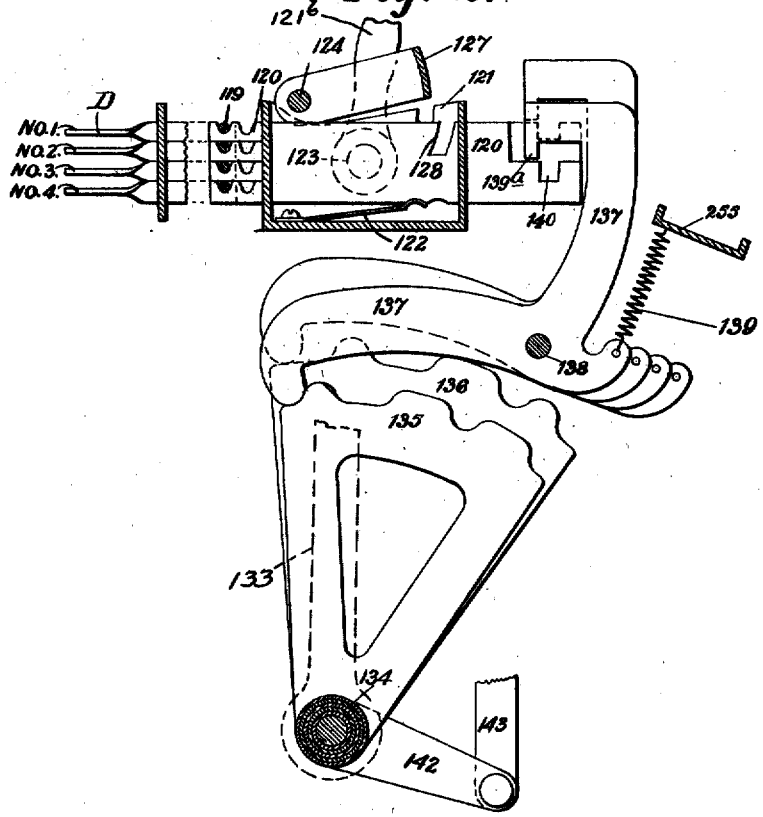

Figures 24, 25, 26, 27, 28:
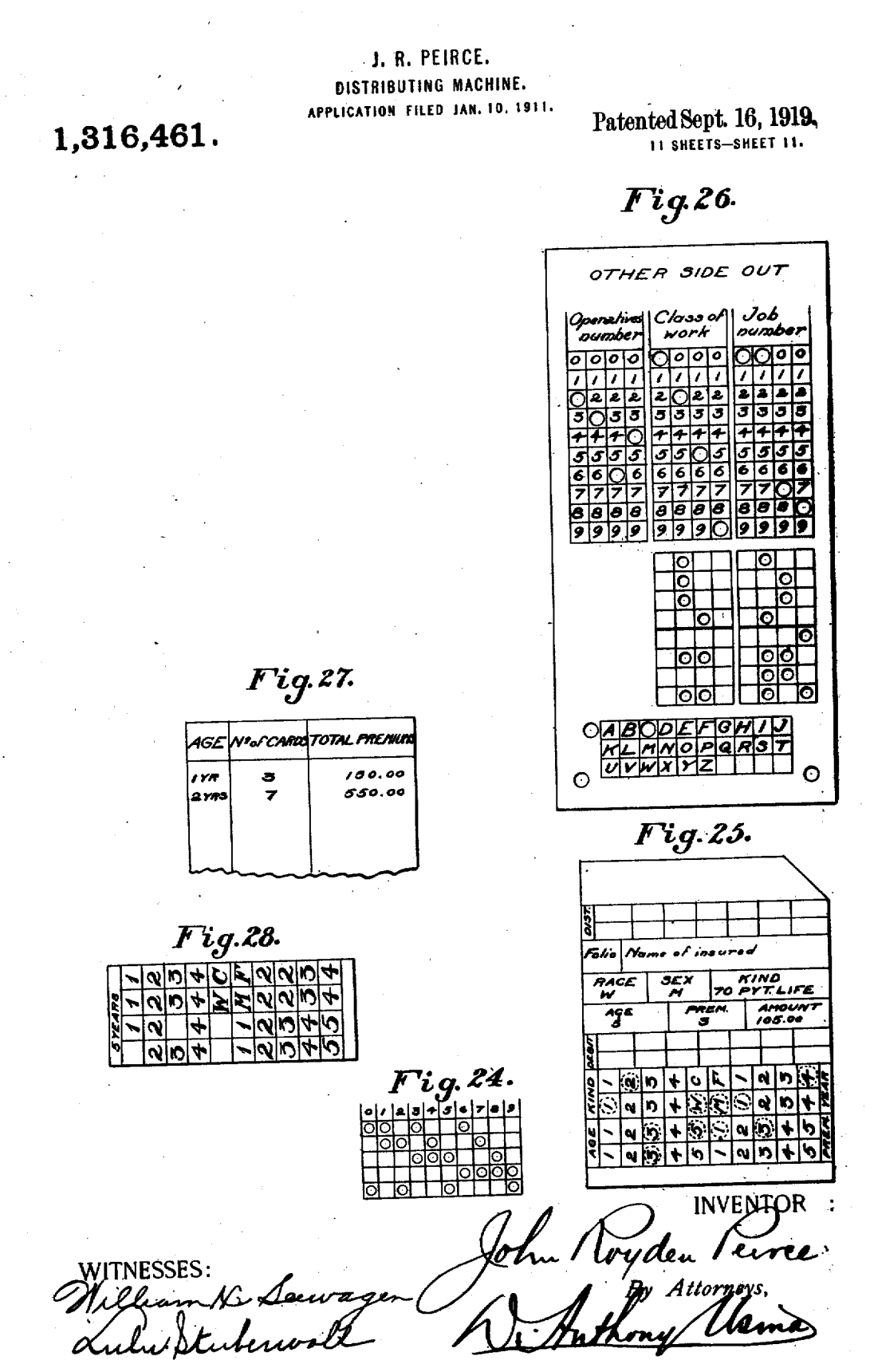

J. R. PEIRCE.
DISTRIBUTING MACHINE.
APPLICATION FILED JAN. 10, 1911.

1,316,461.

Patented Sept. 16, 1919.
11 SHEETS—SHEET 11.

INVENTOR:
John Royden Peirce
By Attorneys,

WITNESSES:

UNITED STATES PATENT OFFICE.

JOHN ROYDEN PEIRCE, OF NEW YORK, N. Y.

DISTRIBUTING-MACHINE.

1,316,461.   Specification of Letters Patent.   Patented Sept. 16, 1919.

Application filed January 10, 1911. Serial No. 601,817.

*To all whom it may concern:*

Be it known that I, JOHN ROYDEN PEIRCE, a citizen of the United States, residing in the borough of Manhattan, city, county, and State of New York, have invented certain new and useful Improvements in Distributing-Machines, of which the following is a specification.

This invention aims to provide a machine for distributing items of information according to one or more different classifications, parts of the machine being similar to certain mechanisms described in my previous Patents Nos. 1,219,766 of March 20, 1917, and 1,260,704 of March 26, 1918.

The accompanying drawings illustrate embodiments of the invention.

Fig. 3 is a transverse section of the central part of the machine, approximately on the line 3—3 of Fig. 9.

Fig. 4 is a similar section on the line 4—4 of Fig. 9.

Fig. 5 is a similar section on the line 5—5 of Fig. 9.

Fig. 6 is a similar section of certain locking and selecting means the line of section being indicated at 6—6 of Fig. 9.

Fig. 7 is a front elevation, with the casing removed, of the controlling pins and adjacent mechanism, the figures showing also the adjacent ends of the reservoirs or trays or races in which the cards are located before and after use.

Fig. 8 is a transverse section of the distributing and recording parts of the machine, the line of section being indicated roughly at 8—8, Fig. 9.

Fig. 9 is a plan of the principal parts of the machine with the casing omitted.

Fig. 9ª is a detail.

Figure 10:
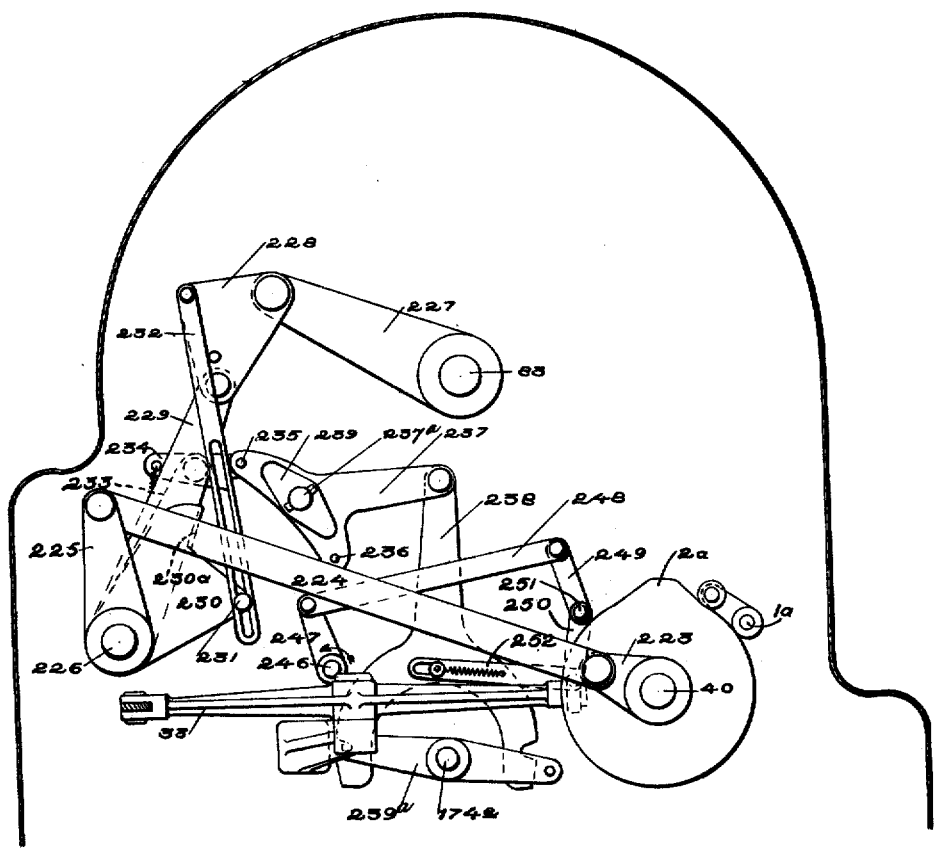

Fig. 10 is a section similar to Fig. 8 approximately on the line 10—10 of Fig. 9.

Fig. 11 is a side elevation of the listing mechanism at the right hand end of the machine, shown in the lower part of Fig. 9.

Figs. 12 and 13 are side elevations of details, the former controlling the selecting mechanism, and the latter controlling the total wheels.

Figs. 14 to 17 inclusive are views in side elevation and diagram indicating an alternative scheme for converting the grouping or combinations of holes in the card into determinations of linear movement.

Fig. 18 is a side elevation, partly broken away, of means for controlling the locking of the pins shown in Fig. 7, coming from the selecting section of the card.

Figs. 19, 20 and 21 are details of mechanism connected with the selector-controlling mechanism of Fig. 18.

Fig. 22 is a printing device for printing a number identifying the classification for which the machine is set.

Fig. 23 is a side elevation of the locking mechanism of Fig. 18 with the parts in another position.

Fig. 24 is a table showing the system of perforations hereinafter referred to as a " superimposed " system.

Fig. 25 is a style of card adapted for use in distributing with this machine the statistical items required for a life insurance company.

Fig. 26 is a card which may be used for keeping items of cost in factories, using the herein described machine containing subtracting mechanism.

Fig. 27 is part of a list printed by the machine.

Fig. 28 is a negative card for controlling the transmitting mechanism.

*General.*—Referring to the particular embodiments of the invention illustrated, the machine is designed to take a number of cards such as that shown in Fig. 25, and as said cards pass through the machine in succession, to count all the cards showing certain facts, and to add certain amounts or other numbers represented by the perforations in said cards. Thus if the machine is set to distribute the information on the card according to ages it will count and calculate for each age the number of cards in the entire list, the total amount of the premiums represented thereby and the grand total of the number of cards passed through the machine. It will register these upon mechanism from which the various data can be taken off and transferred to suitable records, perforated, printed or otherwise; or the registering mechanism may carry one or more indicators upon which the several quantities are visible so as to permit of their being copied by hand upon a suitable list; the machine, however, being preferably provided with an attachment or an additional section or unit of mechanism by which after a group of cards has been run through the machine the resulting distribution can be listed or tabulated upon a single sheet or ribbon of paper. Such a list is indicated for example in Fig. 27 showing in the first column the successive ages; in the second column, the number of cards corresponding to each age, which number is computed by a simple counter moving one step at each operation; and in the third column, the aggregate amounts represented by the several cards for each particular age, these amounts being obtained by a true adding mechanism which advances at each operation of the machine in accordance with the amount represented by the card controlling that operation. Instead of a continuous list the machine may be adapted for making individual records, preferably perforated upon individual cards which are to be subsequently run through a separate machine when a list is required, as described in my aforesaid Patent No. 1,260,704.

The machine may be similarly used for distributing the items according to years, kinds of insurance, sexes and races, and, by a suitable modification of the card and machine, according to practically any desired classification.

The card of Fig. 25 is divided into portions which are perforated according to the information conveyed. The letters W and C indicate the race, colored or white. The letters M and F indicate the sex, male or female. The age and premium portions of the card have five hole spaces in each of two columns, numbered for convenience in punching and punched according to a superimposed system; so that the perforations serve to control the distributing machine and also to control a device for sorting the cards. Comparing the card with the table, Fig. 24, it will be seen that it indicates five years and premium No. 3; zeros being punched in the first column in each section for use in sorting the cards. No sorting of the cards is desired according to the items of the other sections. Each column in the sections indicating kind and year has only four spaces, and only such numbers are used as can be represented according to the table, Fig. 24, by two holes in the first four spaces, namely digits 1, 3, 4, 6, and 7 and 8 in each column. For indicating race and sex only two spaces are required as above described.

For keeping account of costs in factories or similar work, a card may be used of the style shown in Fig. 26. This card is designed for a machine using two different systems of perforations. The selecting mechanism is controlled by a single-perforation, ten-hole-spaces system, and the items are applied upon the registers selected by a combination four-hole-spaces system. In the upper part of the card are the portions which indicate the items which may be selected, namely, the operative's number, class of work, and the job number. The lower part of the card is designed to be punched by a machine similar to that shown in my application No. 489,440, and others. It may indicate at once the amount to be charged to the job, and to be credited to the operative, or it may indicate the amounts represented by the positions of the clock at the beginning and the end of the work respectively. Or these may be the printed indications of the actual time of beginning and ending the work. Preferably both the times and the amount of money represented thereby, are punched in the card though only the amounts of money are to be used. The table at the bottom of the card shows a number of spaces each of which represents a rate at which the operative's time on the job is to be charged. This is usually known only to the time clerk, and he punches it in the appropriate space on the card. Then when the card is introduced into the machine the position of this hole determines the rate at which the time is to be charged. In the card illustrated the times 8.10 and 3.20, are printed for the information of the operative. The adjacent columns of perforations indicate, the left hand group the times, and the right hand group the corresponding moneys. With such cards the distributing machine will be provided with subtracting mechanism determining the difference between the two amounts punched and impressing this difference upon the selected register.

The cards may be made by hand and fed to the machine by hand, but preferably machinery is used for both these operations, suitable feeding mechanism being illustrated herein. With this mechanism all the cards containing the information to be distributed are placed in a tray or in a raceway and are fed therefrom in continuous succession to the pocket or the operative position of the card and thence to another raceway or tray; the machine taking off the desired items and registering the desired information, and indicating and listing if preferred. Thereafter if another kind of information is required the machine is set back to zero, the lever corresponding to the desired class of information is shifted, and the cards are again run through the machine. Thus for distributing the information on the card of Fig. 25 according to ages and premiums, the most commonly required distributions, two runs of the machine are required, each consuming, of course, sufficient time for the passage of the cards, and, if desired, the listing of the results.

*Card pocket and feeding mechanism.*—The mechanism of Fig. 7 is shown in connection with a card feed like that of my prior application No. 519,925. The cards are received in a head race A and after use are delivered into a tail race B, a reciprocating slide C serving to transfer a used card down into the tail race at the same time that it delivers the next unused card to a position where its several hole spaces are in line with the controlling pins D.

Figure 2:
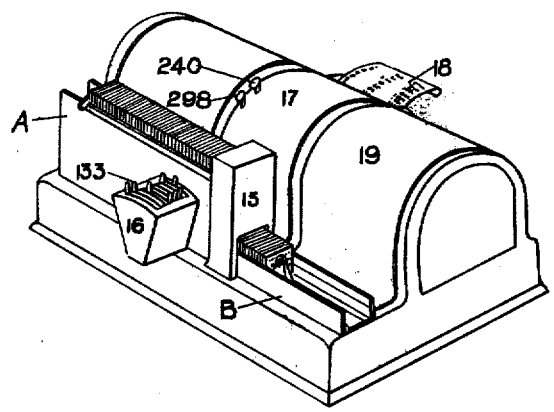
Figures 1 and 2 are perspective views of the machine from the front and the rear respectively.
Figure 1:
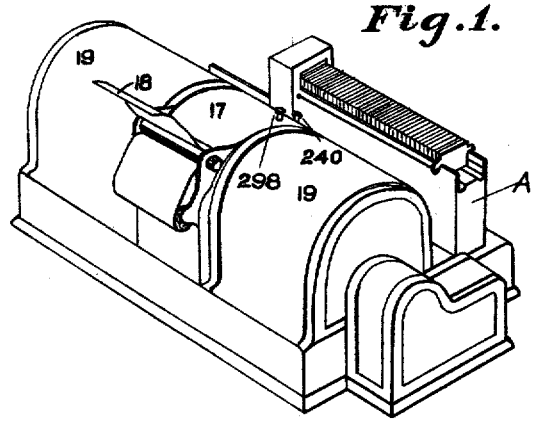

*Feeling pins and transmitting mechanism.*—The feeling pins D (Figs. 7 and 9) are located along the front of the machine and move in a longitudinal direction, the general arrangement being indicated in Figs. 1 and 2 where the head race A is above the casing carrying the pins and the tail race B also extends along the front at a lower level, a casing 15 inclosing the card in its recording position. Certain controlling levers hereinafter described are located in a casing 16 at the front of the casing which incloses the pins. The casing of the principal parts of the machine comprises a central portion 17 inclosing the controlling or main section of the mechanism, which is in most direct connection with the feeling pins, and which carries also the listing apparatus for making the list 18; the casing including also side portions 19 of greater or less length according to the capacity of the machine.

The grouping of the pins D is indicated in the end view, Fig. 4 as corresponding with the grouping of the spaces at the lower part of the card, Fig. 25, when the latter is laid sidewise, on its right hand edge, this being the position in which it is fed through the machine. The plate 20 is a fixed guide for the ends of the pins. The pins are pressed forward by springs 21 and are held back by a plate 22 which prevents their movement to enter the card until the machine begins to operate. The two upper banks of pins D, corresponding to the "age" and "kind" sections of the card are the selecting pins in the design of the apparatus illustrated. Each of these banks is two pins wide. The outer one is four pins high and the inner one five pins high. These selecting pins extend back to selector controlling mechanism which may be of several different constructions.

The shaft 28 is rocked through a link 32 (Fig. 9) connected at its opposite end to a rocking lever 33 actuated by a cam 34. This cam is designed so that the pins advance into the cards during the first part of the forward stroke of the machine and are withdrawn during the latter part of the forward stroke and remain withdrawn until the beginning of the next stroke. This gives abundant time for the shifting of the cards and other supplementary operations hereinafter referred to. The slide C is reciprocated through a shaft 35 which is rocked by means of the bevel gear 36 and 37 (Fig. 9) and the shaft 38, the latter being operated by an arm and a link 39 which is fastened to a crank, mounted on the motor shaft 40. The finger 41 (Fig. 7) is actuated by cranks and a link from the shaft 35 and is pushed into the path of the card when the latter is being brought down, to prevent its going too far.

As illustrated the machine is intended to add only one class of items (say the "premiums" on the cards shown in Fig. 25 for example). The pins corresponding thereto are the lower five pins in each of the two outer columns. These, therefore, may be called adder pins. Each adder pin has a stop pin 43 projecting upward into the plane of a corresponding bell crank 42, Fig. 9. The bell cranks are arranged one above another on a shaft 43$^a$. The inner ends of the bell cranks engage each a pin 21$^a$ on the end of its slide 44. In this way the motions of the feeling pins forwardly through the perforations in the card are transmitted to the adding mechanism.

The machine is provided with means by which any one of the selectors can be turned to operative position. The mechanism is illustrated chiefly in Fig. 9. The bell cranks 45, 46, and their duplicates directly under them, rotate on shafts 47, 48 which are shiftable in directions parallel with the pins so as to render one set of bell cranks operative and the other set (or sets where more than two classifications and selecting mechanisms are employed) inoperative. In the position illustrated the bell cranks 45 are shifted to the operative position in which their outer arms are engaged by pins 49 on the corresponding feeling pins, and the bell cranks 46 are shifted away from the striking pins 50 on their corresponding feeling pins; so that the advance of the striking pins 50 is without effect, but the advance of the striking pins 49 actuates the selecting mechanism accordingly. The shifting of the shafts 47 and 48 is effected from a slide 51 which extends to a point outside the machine where it can be pushed inward or outward by hand. It is connected through a bell crank 52 and link 53 to the shaft 47 the latter being guided by an arm 54 pivoted at its end 55. The shifting of the shaft 48 is through a link 56 acting on the end of an arm 57 which rocks a shaft 58 carrying arms 59 engaging the shaft 48. By these means the movement of the slide 51 shifts the shafts 47 and 48 respectively in opposite direction.

The inner arms of the bell cranks 45 and 46 are always in engagement with striking pins 60 on slides 61 which control the selecting rings or selectors.

Where more than one set of adding pins is to be used as where each of the two double columns of pins in Fig. 4 is to be used, and where it is desired to use one or the other set alternatively, stop pins 62 are provided on the pins and a locking and selecting slide 63 (see Figs. 6 and 9) is arranged to be shifted by hand across the feeling pins D, the slide being provided with notches 64 which in one position permit the movement of one set of feeling pins and in the other position permit the movement of the other set; the solid portions of the slide being engaged by the stop pins on the feeling pins which are to be held inoperative.

*Alternative transmitting mechanisms.*—
The means for transmitting the movement of the feeling pins and converting it into linear movement of the selecting and adding mechanism may be of various other designs. As an alternative to the combs or slides 44 of Fig. 3, I have disclosed a mechanism which I designate "independent combs" and which is illustrated in Fig. 14. This is for a card using various combinations of four-hole-spaces. Fig. 16 is a table according to such a system. Each group of four feeling pins (that is, pins D as above described or extensions thereof) has its movements transmitted to the four combs 64, 65, 66 and 67, respectively (Figs. 14 and 17) through levers similar to the bell cranks 45 and 46 referred to above. The length of each comb consists of ten spaces notched in such a way that for the successive digits, 0, 1, etc., there is a continuous notch at a corresponding point of the group of combs extending continuously across the top. Fig. 17 shows in plan the spacings and the positions which the continuous notch assumes for each of the successive digits; the parts being in the zero position in the drawing.

Corresponding with the positions of the transverse grooves in the combs, is a series of plates 68 extending transversely over the group of combs, each of which is connected by an arm 69 to a hook 70, the whole being pivoted on a shaft 71. For each digit the arm 69 is of suitable length corresponding with the position of the digit in Fig. 17, and the hooks 70 are of regularly increasing lengths for the digits from 0 to 9. Fig. 15 shows the member corresponding to No. 5.

The combs are reset in the zero position after an operation by a pin 72 passing through the entire group and carried on an arm 73 fixed on a shaft 74. The shaft 74 is turned clockwise at the beginning of an operation and permits any one or any combination of the combs to advance, which they do under the pull of the feeling pin springs. Thereafter the shaft 71 is rotated anti-clockwise against its normal restraining spring 75 so as to move down the arm 76 and the rod 77 which, after an operation, is used to reset the hooks 70. The shaft 74 is turned by means of an arm 78 on said shaft. A second arm 79 thereof strikes a pin on the end of an arm 80 on the shaft 71 in order to turn the latter. When this alternative mechanism is to be used, the arm 78 will be attached at its lower end to a link on the pin plate 22 so as to operate just after the pins have been allowed to enter the card.

A typical sector 81 is indicated in Fig. 14 actuating, for example, an adding register 82. The sector rotates about a shaft 83 which is normally stationary and which carries arms 84 carrying a resetting rod 85 against which the sectors are pulled down by the springs 86. The sector 81 has a plate or shoulder 87 which lies just within the line of hooks 70 in the inactive position of the parts. When the machine is operated one of the hooks 70 is pulled inward by its spring 88 so as to lie in the path of the shoulder 87 and thus determine the desired linear movement of the sector when the shaft 83 is turned to move down the resetting rod 85. The combs 64—67 are connected to the feeling pins in the same way as the slides 61, Fig. 9, so that for each pin which finds a perforation the corresponding comb moves to the left. In Fig. 17, if the combs move according to the combinations indicated in the table (Fig. 16) it will be seen that they will provide open slots clear across the group at the points marked 0, 1, 2, etc., in Fig. 17. This will allow the corresponding plate 68 to move down and the corresponding hook 70 to swing inward so as to stop the downward movement of the sector at a point corresponding to the distance required.

*Negative card control of transmitting mechanism.*—In the arrangement shown in Fig. 9 the pins D extend to a pocket 23 composed of a pair of perforated plates between which may be introduced any one of a series of selector controlling cards or thin plates of metal. When the machine is operated those pins advance which find holes in the card. A forward movement of the pocket 23 is necessary in order to permit the operation of the machine. The rear ends of the selecting pins D which do not advance (being stopped by finding an imperforate space in the regular controlling card or positive card in front of plate 22) are in position to be struck by the selector-controlling plate in the pocket 23. In order that this pocket 23 shall advance and the machine shall operate for any given card it is necessary, therefore, that the controlling plate in the pocket 23 have perforations in line with the ends of those pins D which are not permitted to advance through the given card. The controlling plates for the pocket 23 are, therefore, negatives of the cards. For example, if the classification is according to the ages and we wish to select only the ages corresponding to the card of Fig. 25, the controlling plate in its age section will be punched only in spaces 2, 3 and 4 of the first column and 1, 2 and 4 of the second column; the spaces corresponding to the pins in the other sections of the card, being perforated in the controlling plate so as to avoid interference by the corresponding pins. Fig. 28 shows such a controlling plate. The numbers and lines thereon may, of course, be omitted, being shown here in order to make the relations clear more easily.

The pocket 23 is suitably guided and connected by means of a link 24 (Figs. 7 and 9) to a spring 25 which in turn is connected to a link 26 which is connected at its forward end to the slide 22. This slide is actuated by means of arms 27 projecting upward from a shaft 28 (previously described) which is oscillated at each operation of the machine. The operation of this shaft, therefore, permits the pins D to advance and pulls the pocket 23 forward through the spring 25 so that the latter also will advance if the card in the machine be one of those which is to be recorded.

The selector controlling pocket 23, when it moves forward, swings an arm 29 on a rock shaft 30 which carries at its inner end a longitudinally extending stop 31 (Fig. 9). The rocking of the shaft swings the stop 31 so that the slots in its edge move into the planes of the main sectors, as 153, Fig. 9ª. When the pocket 23 does not advance, however, the unslotted part of the stop 31 is in the plane of the sector and prevents the advance of the latter so that there is no selection of any register and no recording of the items on the regular controlling card.

The stop 31 may be arranged to act not upon the sector directly, but upon any part of the mechanism which controls the operation of such sector. Or indeed this mechanism may be used to suppress the operation of any desired part of the machine.

Besides the simple method described of controlling the selectors by means of negative cards, various other means may be devised for the same purpose and forming attached parts of the machine, such for example as the comb arrangement of Fig. 18, referred to in detail hereinafter. Or, the machine may be used without any individual selecting or selector controlling means.

*Locking apparatus for selectors.*—Where combinations of pins such as shown in Fig. 7 are used I may use a negative plate, as described in connection with Fig. 9, or I may use various other locking apparatus for the selectors; either to lock in or to lock out cards of a determined classification. An apparatus for this purpose is shown in Fig. 18.

The lock in Fig. 18 is controlled by combs analogous to those previously described (this mechanism being alternative to the negative cards as above stated). The pins D corresponding to the selecting section of the card, being the same pins shown in Fig. 7, or being extensions thereof, carry upon their rear ends lateral studs 119 adapted to engage one or the other of two notches in the ends of combs 120, which ends overlap the sides of the rear ends of the pins. The combs slide longitudinally in a frame or box 121 and are held impositively by springs 122 engaging one or the other of two notches in the lower edges of the combs. The box 121 is adapted to tilt about a transverse pivotal axis, the box carrying a transverse shaft 123 which is turned by a handle 121ᵇ from the outside. There is one comb 120 for each pin. The link 26, Fig. 7 is connected to a locking shaft 124 (Figs. 18 and 19) in the manner shown in Fig. 19. The link is connected directly to an arm 125 freely pivoted on the shaft 124 which in turn is connected by a spring to an arm 126 fixed on the shaft so that when the link 26 is pulled the spring tends, through its connection with the arm 126, to turn the shaft 124 if the latter is free to move. It will be remembered that when the machine operates the travel of the carriage 22, Fig. 7, first presses the pins with a spring pressure against the card; and the continued movement will pull the link 26 so as to tend to turn the shaft 124. This shaft carries a fixed arm with a locking control piece 127 (Fig. 18) which is in position to enter notches 128 in the combs 120 if all the latter are advanced to bring their notches in the path of the control piece 127. In Fig. 18, pin No. 3 is engaged with the rearmost notch of its comb and holds its comb forward with its notch in the path of the control piece 127; the other pins being reversely connected with their combs. In this position of adjustment it is necessary that the combination represented by pins Nos. 1, 2 and 4 only be advanced in order that the control piece 127 may enter the notches 128.

This mechanism of Fig. 18 finds out the combination of perforations in a certain section or sections of the card and determines that the machine shall or shall not be operated when the determined combination exists in the car. It is to be distinguished from the comb mechanism of Fig. 14 which determines a different length of stroke of the sector for each different combination of perforations existing in the card.

This movement of the shaft 124 is used to determine whether or not there shall be an operation of the machine. The mechanism for insuring an operation, for the combination for which the mechanism is set, is shown in Fig. 20; and the mechanism for preventing an operation of the machine under the same circumstances, in Fig. 21.

The mechanism for locking in the determined combination, Fig. 20, comprises a crank 129 fixed on the end of the shaft 124 which extends into the machine and carrying on its end a pin adapted to engage a shoulder on the arm 130 which is loose on the shaft. This arm 130 carries a flange 131 normally in the path of the selecting sectors 186 (whose connections are described hereinafter) so that the latter cannot move down and select a register until the shaft 124 is actuated to withdraw the flange 131 laterally out of the path of the oscillating sectors. Consequently if the pins do not advance according to the combination selected there is no selection of a register and no operation of any register; whereas if they do advance according to the selected combination then the machine is free to operate, the selecting sectors 186 advancing according to the selected combination.

For locking any particular combination out of use there is substituted, Fig. 21, an arm 130ª, the projection 131ª of which is normally out of the path of the oscillating sectors 186, and swings into such path when the combination in question occurs; thus rendering the machine inoperative for such determined combination, and having no effect for any other combination.

The mechanism described, instead of controlling the operation of the selecting sectors 186 may be used to control other parts of the machine. For example, the sectors 186 may be substituted by sectors or arms upon the operating shaft of the machine in which case this shaft will be locked into or out of operation for any determined combination.

The combs 120 are set forward or backward according to the desired combination by means of levers 133, Fig. 2. These levers are connected within the casing to a series of shafts 134, one within another, Fig. 18, and each shaft carries four sectors 135, 136, etc., grouped together and provided on their edges with projections and depressions by which when the shaft is turned there is a lifting and a lowering of the lower ends of levers 137 pivoted on a shaft 138 and pressed downward by springs 139. The upper ends of the levers 137 are approximately vertical so that they swing from right to left or vice versa. The upper ends of the levers are provided with hooks 139ª which are normally just above notches 140 in the projecting rear ends of the combs 120. When an adjustment is to be effected the box 121 is turned on its pivot, releasing the engagement of the studs 119 with the forward ends of the combs and bringing the notches 140 of the rear ends of the combs into engagement with the hooks 139; whereupon the shifting of the cam sectors 135, 136, etc., sets the combs to the desired position. The rear end of the box is then swung downward again, releasing the combs from the hooks 139, misplacement of the combs being prevented by the impositive locks 122, and swinging their inner ends into proper engagement with the studs 119 on the feeling pins. The projections and depressions on the edges of the sectors 135, 136, etc., correspond to the scheme of perforations representing the several digits.

In printing a record of the amount registered it is desirable also to print a number identifying the classification to which the amount corresponds. Such of the levers as are to have their numbers printed on the record are connected with printing sectors illustrated typically at 141 in Fig. 22 and located preferably in the center or master section of the machine. These printing sectors are connected to the hollow shafts 134 by means of cranks 142 and links 143 so that the type corresponding to the position of the shaft shall be in operative position opposite the usual printing hammer.

*Register selecting, operating and resetting mechanisms.*—This mechanism is closely analogous in construction and operation to that of my previous Patents Nos. 1,219,766, March 20, 1917, and 1,260,704, March 26, 1918, and it will be necessary to describe at length only those points in which the present machine differs from the previous machine. The machine has a master section, located preferably at the center, from which the mechanisms in the other sections are moved or controlled. Fig. 3 is a transverse sectional view of this master section, being a vertical section in the plane of one vertical row of slides 44 by which the motions of the feeling pins are imposed upon the adding mechanism. The forward swing of each of the primary sectors 153 is limited by one of the shoulders 154 thereon striking the inner end of an angle lever 155, the outer end of which hooks over a fixed stop 156 and lies in the paths of pins 157 on the inner portions of the slides 44, whereby the angle lever may be swung to bring its inner end into the path of a desired one of the shoulders 154; a vertical movement of the lever 155 being also permitted by mounting it upon a sector 158, which is pivoted like the primary sector 153 upon the central shaft 83 and which is provided with a shoulder 159 adapted to strike lateral projections 160 upon the ends of the slides 44 when the latter are advanced; so that by various combinations of the four slides ten equal steps are secured in the movement of the primary sector 153, as described in detail in my previous applications above referred to.

The resetting rod 85, which restores the sectors 153 to their starting position is mounted on a plate or lever 84ª fixed on the shaft 83. Until this resetting rod 85 is moved downward to release the primary sectors the slides 44 are locked in their zero position by means of vertical slides 161 having approximately U-shaped slots 162 engaging pins 163 on the slides 44 and locking them in their retracted or in their advanced position; the slides 161 being pulled down by springs 164, and being pushed up by the engagement of a pin 165 on the resetting plate with the end of a link 166 which connects by an angle lever 167 with the slide 161.

Each of the primary sectors 153 has connected to it and moving with it a printing or type sector 168 carrying on its edge a set of types 169 adapted to be moved to printing position in line with the hammer 170 and the paper upon the platen 171 in front of which extends the ribbon 172, so that the step by step advance of the primary sectors 153 brings the successive types from zero to nine successively into adding position, whereupon the hammer is released and the figure is printed as in ordinary adding machines and in my previous applications above referred to.

The different sections of the machine have sectors similar to the sectors 153 of the master section and parallel therewith. Each of the primary sectors 153 operates a corresponding sector in each group of a secondary section of the machine. The motions are transmitted from the master section to the secondary section or sections by means of shafts running longitudinally of the machine and which are grouped for convenience in four groups 173, 174, 175 and 176. The motion is communicated from the sector 153 which is illustrated in Fig. 3, through a link 177 and a lever 178, the latter being connected to a spring 179 which tends to pull the sector downward. The sectors 153 are connected in this way to the several shafts 173 and 174; the shafts 175 and 176 receiving their motion from the type carrying sectors 168, which move upward as the sectors 153 move downward, so that the connections of the rear groups of shafts 175 and 176 are reversed as compared with those of the front groups.

The primary sectors 153, besides controlling the movements of the secondary sectors in other sections of the machine, which in turn actuate registers, themselves actuate total registers 180 and 181, one of which may be used for keeping a continuous or grand total and the other for keeping sub-totals; from which at the end of a run the readings can be taken off and printed upon a ribbon or otherwise, in a manner hereinafter described.

One of the registering sections of the machines which is controlled by the master section just described, is indicated in transverse section in Fig. 8. The shafts 173, 174, 175 and 176 which convey the movement of the sectors from the master section to the registering section are connected by means of cranks 182 and links 183 with the sectors or rings of the registering section. This mechanism is also very similar in principle to that described in my patents above referred to.

There are a number of registers forming a substantially complete circle about the central shaft 83 each register being complete with its toothed wheels and carrying, setting and releasing devices; the shafts for each register being mounted in end plates 184 indicated in the lower part of the circle. The other parts of the circle indicate sectional views on different planes to show the different mechanisms. These mechanisms are controlled by five different rings. The first is the supplemental throw-off ring 185 which throws the selecting mechanism out of the way immediately after it has acted. The second is the selecting ring 186 (or rings, in the case illustrated, corresponding to the several decimal places required). The third is the register-operating ring or rings 187, shown in the minus one position. The fourth is the main throw-off ring 188, which throws the registers out of engagement with the operating ring. The fifth 189 is the resetting sector for restoring the several carrying mechanisms to their starting positions. The number and location of these actuating and controlling rings is indicated in the horizontal view, Fig. 9. Each of the rings is mounted loosely by means of radial arms on the shaft 83.

The ring 185, the supplemental throw-off, has on one of its radial arms a lateral lug 190 and on another a spring 191 for returning it to the starting position shown, its return movement being limited by a second lug 192 on another one of its arms striking a fixed shaft 193. The spring keeps the supplemental throw-off ring in its starting position and the selecting mechanisms of the several registers out of engagement until the end of the stroke. At the end of the stroke the lug 190 is struck by a pin 194 on the end of an arm fixed upon the shaft 83 and causes the ring to turn positively with the shaft so that the throw-off ring 185 releases the selecting pins of the several registers and allows the appropriate one to come into engagement with the notches in the selecting sectors, or rings. The selecting rings are provided with approximately radial notches so located that they come into line with a selecting pin upon the proper register, which selecting pin enters its notches and causes the register to swing inward into position for engagement with the operating rings, the selecting rings being operated directly by the links 183, or as previously described in detail in my previous applications above referred to. The operating rings 187 are likewise operated directly by the links 183 as described in my above applications. The main throw-off ring 188 is operated from one of the transmitting shafts 174ᵃ through a reversing mechanism illustrated in Fig. 10 and hereinafter described in detail, also in a manner similar to that described in my above applications.

The fifth ring 189, for resetting the carrying mechanisms, has on one of its arms a lug 195 and is turned by means of a spring 196 which causes it to follow the pin 194 as the shaft 83 turns. This resetting ring 189 acts during the forward movement of each stroke. It has a scalloped edge and when advanced the depressions in said edge permit the rollers on the ends of resetting arms 197 to swing inward with the effect hereinafter described.

The shaft 193 runs through the several rings and is provided with a hook 198. When totaling, in which case two strokes of the machine are used, the hook is thrown into engagement with a shoulder 199 on each of the register operating rings at the first stroke so as to prevent the rings from going back to minus one during the totaling operation.

For the purpose of carrying from one decimal place to the next higher the adding wheels, except the one corresponding to highest place, are provided with pins on their side faces which in passing from nine to zero strike lugs upon the bell cranks 200. Each set has its group of these bell cranks turning loosely upon a shaft 201 and each bell crank has a rear extension 202 terminating in a hook which hooks are normally out of the paths of pins 203 on the operating rings 187. Each hook 202 is in the plane of the pin 203 of the operating ring of the next higher decimal place. When any register is selected and moved inward into engagement with its operating rings the hooks 202 also move inward into the paths of the pins 203. These hooks 202 in such case serve to stop the backward movement of the operating sectors at the true zero position. When any adding wheel of the register which is in gear passes from nine to zero the carrying lever 200 is depressed, as above explained and the hook 202 lifted out of the path of the pin 203 corresponding to the next higher wheel of the register so that the operating sector for the next higher wheel moves one step farther in its backward movement, which is its registering movement. That is, it carries one.

The register consists of a set of wheels on a shaft 204 which is carried in arms 205 keyed on a register-carrying shaft 206. Positively attached to the shaft 206 is a crank 207 and turning loosely on the same shaft is a control piece 208 having in its end a pin 209 which is allowed at the appropriate time to press inward upon the peripheries of the selecting rings 186 so as to fall into the notches thereof if the rings advance to position corresponding to this register. There is a hold piece 210 pivoted upon the crank 207 and having at its outer end a pin 211 engaging a nose on the control piece 208. Springs (not shown) tend to draw the several registers inward into engagement with their racks and tend to draw the arms or cranks 207 inward, so that the hold piece 210 is always pressing inward but is restrained by the control piece 208 unless the pin 209 on the end of the latter finds notches on the selecting rings and enters them. The control piece 208 turns on a sleeve on the shaft 206 which sleeve is rigidly attached to a crank 212 (see the upper right hand part of the figure), which through a link 213 and a crank 214 rotates a third shaft 215. In the upper left hand part of the figure it will be seen that the shaft 215 carries small cranks 216 one for each wheel and also slightly longer cranks 217 the ends of which are normally in the paths of the outer ends of the carrying bell cranks 200. An inward movement of the control piece 208 therefore acts through the links 212, 214 and the shaft 215 to release the carrying bell cranks 200 and to allow them to rotate in a clockwise direction under the influence of springs (not shown) so as to throw the hooks 202 inward to their operative positions in the paths of the pins 203 and to throw the parts 200 outward into the paths of the carrying pins on the several adding wheels so that they may be actuated as above described. The pieces 208 and 216 are both under the control of light spiral springs on their shafts and tending to rotate them in a clockwise direction. The appropriate selector control piece swings into engagement with the selecting rings as soon as the latter have moved forward to their determined position. On the first supplemental part of the return stroke the control piece 208 which moved inward is thrown outward again so as to permit the return of the selecting rings, but the register which has been selected remains in gear with the operating rings.

The register is moved into gear by the rotation of the shaft 74. On this shaft is an arm 218, the lower left hand of the figure, on the end of which is pivoted a pawl 219 having a shoulder which, when the arm 218 moves inward, engages under a pin in a stop 220 which is pivoted and has upon its free end a shoulder for engagement with a pin upon an outwardly projecting portion of the arm 197 previously described. Whenever a register is moved out of operative position the shaft 206 about which the register swings is also turned in a clockwise direction and the arm 218 acting through the pawl 219 lifts the stop 220 away from the pin on the arm 197, allowing the latter to swing inward. The arm 197 is mounted on the shaft 201 which tends always to turn in a counter-clockwise direction by means of a spiral spring, not shown. Positively connected with the shaft 201 is a crank 221 having at its end a pin projecting under the several hooks 72 constituting the carrying mechanism for the register. The resetting ring 189 having advanced during the forward stroke, the arm 87 is allowed to rotate or swing inward, swinging the arm 221 outward and resetting any one of the carrying hooks 202 which may have been used in the previous operation of the machine. On the return stroke the arm 197 is again thrown up by the roller on its end riding on the scalloped edge of the resetting ring 189 and the pin on the arm 221 is thrown out of the way. The stop 220 swings inward to engage the pin on the arm 197 and holds the latter out until the next time that this particular register is selected. By this means all the connecting and controlling mechanism of a register is maintained out of operation and practically unmoved except when the register in question is to be operated.

The arm 205 which carries one end of the wheel shaft 204 has an inwardly projecting portion carrying a roller 222 which rides upon the inclined edge of the main throw-off sector or ring 188. When the ring is advanced the several registers are freed therefrom so that they may move inward under control of the selecting mechanism. On the return stroke the supplemental throw-off is first actuated as above described and, at the end of the stroke the ring 188 throws the registers themselves out of engagement with the operating racks. That is to say it throws out the register or registers which have previously been selected and thrown in.

Means for actuating the shaft 83 and its arm carrying the pin 194 are indicated in Fig. 10, being located at the left of the machine, as shown in Fig. 9. The motor shaft 40 previously referred to revolves continuously and carries a crank 223 which actuates a link 224 which is connected through a crank 225 to a shaft 226 so as to oscillate the latter. The shaft 83 has an arm 227 which is connected with the shaft 226 by a link 228 and an arm 229 forming a toggle. An arm 230 is rigidly mounted on the short shaft or stud 226, the arm 229 being loose thereon. During the first part of the movement of the shaft 226 the shaft 83 is held by the toggle. After the first supplementary motion has taken place the toggle is broken by a pin 231 which strikes the bottom of a slot in the link 232, the upper end of which is connected with the toggle link 228. The continued movement of the shaft 226 causes a movement of the shaft 83. The lip 230ª returns the arm 229 and shaft 83 to starting position.

The supplementary motions of the shaft 174ª are effected by means of another crank 233 indicated in dotted lines, which is fixed on the shaft 226 and which carries at its end a pivoted double pawl 234 which engages alternately pins 235 and 236 upon a three armed lever 237 which is mounted on a stud 237ª and held impositively in any position to which it is moved by means of a friction-spring 239. The third arm of this lever engages the upper end of a slide 238 shaped like an inverted Y and the lower arms of which are provided with notches adapted to engage one or the other of the pins in the opposite ends of the cross arm 239ª fixed on the shaft 174ª. When the Y-piece engages the right hand end of the cross arm 239ª the first and the succeeding odd strokes of the machine will turn the shaft 174ª to the right and the second and succeeding even strokes of the machine will turn the shaft 174ª to the left. When, as in the drawing, the Y-piece engages the left hand end of the arm 239 this operation will be reversed. The slide 238 is supported at its upper end by its connection with the lever 237. This reversing gear extending from the operating arm 233 to the oscillated shaft 174ª is not new in principle, being adapted from a similar mechanism well known in adding machines.

*Totaling and listing totals.*—When a total is to be taken a button 240, Fig. 3, is pressed until the transverse part of the slot 241 in the rod 242 comes into line with a fixed button 243, whereupon the spring 244 pulls the notch into engagement with the pin 243 and holds the button down. This performs a number of setting functions.

Through a bell crank 245 a shaft 246 (Figs. 3 and 10) is turned to the left. This shifts the position of the Y-piece 238 through the arm 247, link 248, arms 249 and 250 on the shaft 251 and the link 252 connected by a spring and slot to a pin on the Y-piece, so as to shift the lower end of the latter to the right to bring it into engagement with the right hand end of the cross arm 239, so as to reverse the direction of operation of the shaft 174ª at the beginning and end of the stroke respectively.

The pushing of the total button and the downward movement of the rod 242, Fig. 3 also effect a forward movement of a link 253 which is communicated to a swinging arm 254 having on its upper end a pin 255 which engages the angle lever 155 and withdraws the inner end of this lever out of the path of its sector 153. The pin 255 engages the entire group of angle levers 155 so as to free all the main sectors 153 of the machine so that they are left free except as they are limited respectively by the distances through which the several wheels of the register move in turning back to the zero position; that is to say, of the particular register which is in mesh with its operating rings and whose total is to be taken. The ordinary registering movement is on the backward stroke of the machine. The totaling movement, however, is on the forward stroke. The wheels of the register being in mesh with the operating rings, these rings move forward and each wheel moves backward until the carrying pin on it strikes the back of the flange on the carrying lever 200; it being understood that the front of the flange is inclined so that the carrying pin may force the lever gradually inward in a normal adding operation, while its rear edge is abrupt so as to stop a backward movement of the wheel at the zero position.

The pressing of the button 240 serves also to throw in the hammer mechanism. Motion is transmitted through the shaft 246 and link 253 to a lever 256 and thence through a link 257 to a second link 258 the rear end of which is connected to an arm 259 and to a link 260 which actuates a pawl for turning the platen 171 which carries the paper upon which the record is to be printed. The pushing of the button lifts the forward end of the link 258 to bring its notched end into the path of a pin 261 on the arm 84ª which is carried by the shaft 83; so that as the shaft turns backward and forward it advances the feeding pawl one step.

The movement of the link 258 acts through the arm 259 to turn the shaft 262 and the hammer-resetting arm 263 fixed thereon and carrying a rod 264 engaging the forward edges of the several arms 265 which are loosely mounted upon the shaft 262 and pulled forward by springs 266. Each of the hammer arms 267 is mounted loosely on the shaft 262 and has a downwardly extending portion with a flange 268 engaging the rear edge of its controlling arm 265. When the shaft 262 is turned at the end of a forward movement of the stroke the resetting rod 264 is withdrawn. Thereafter the restraining pawls 269 are withdrawn to permit a hammer movement for such of the sectors as have been actuated. This is a common type of hammer mechanism for adding machines. Any other known or suitable mechanism for the purpose might be used. The withdrawal of the pawls 269 is effected by means of a link 270 the upper end of which has a pin and slot connection with the sector 153; the lower end of the link 270 being normally free from the pin 271 by which it actuates the pawl and being moved into engagement with such pin through links 272 connected with the lever 256. A lever 273 serves to hold the pawl 269 down whenever the type carrying sector 169 is lifted and to hold the pawl down until the sector returns to its starting position and strikes the upper arm of the lever.

The reversal of the operation of the shaft 174ª as above described reverses the operation of throwing the register into engagement with the operating rings; that is to say it throws the register into engagement at the beginning of the stroke, so that its wheels act on a forward movement of the racks and are thrown out of gear at the beginning of the rearward movement so as to avoid conveying any adding movement to the wheels. The selecting rings are controlled by sectors 274, Fig. 12 lying in parallel planes with the main operating sectors 153 of Fig. 3. The controlling mechanism is of the same character as for the main operating sectors, but their movement being only half as great. The other parts of the mechanism are numbered similarly to the parts in Fig. 3 for better identification.

When the total button is pressed and a selected register is in gear the total of that single register may be taken. I prefer to provide, however, mechanism whereby the pressing of the total button and the operation of the motor will successively select and print the totals for all the registers. Principal parts of the mechanism for effecting this successive selection of the registers is indicated in Fig. 11. Fixed on the shaft 83 is an arm 275 carrying a pin 276 engaging the edge of an arm 277 which is free on the shaft and is pulled upward by a spring 278, so that as the shaft oscillates the arm 277, at the end of each forward stroke and the beginning of each backward stroke, oscillates between two stop pins 279 and 280. This arm carries a pawl 281 engaging a ratchet wheel 282 which is fixed upon a pair of stepped disks 283 and 284 lying in adjacent planes and corresponding respectively to units and tens decimal places of the successive numbers identifying the registers to be selected. Of the group of shafts 175 indicated in Fig. 3 we may suppose the upper two to be indicated in Fig. 11. One of these shafts carries an arm 285 in the path of the unit disk 283 and the other shaft carrying an arm 286 in the path of the tens disk 284. As the disks rotate together step by step the arms 285 and 286 will successively assume positions corresponding to the numbers from one to eighty and the shafts 175 upon which these arms are mounted, and the selecting rings which are actuated by these shafts, will assume corresponding positions and the corresponding registers will be successively selected; it being remembered that the card controlled selecting mechanism is withdrawn by the pressing of the total button.

The pushing of the total button 240 (Fig. 3) operates, through the shaft 246 certain parts of this mechanism for automatically selecting the registers in succession, the shaft 246 being extended through to the mechanism of Fig. 11 and being shown in the lower left hand part of this figure. Through the links and levers illustrated at 287, 288, 289 and 290, the shaft 193 is turned. This is the shaft which extends through the registering section of the machine and carries the minus one lock 198, Fig. 8, and the movement is such as to withdraw the lock so as to permit a complete movement of the operating rings.

The shaft 193 also carries, Fig. 11, a hook 291 which holds the pawl arm 277 retracted so as to prevent its operation until the total button is pushed, which withdraws the hook 291.

It requires two steps of the ratchet 282 to move the stepped disks 283, 284 one step forward, because the totaling operation calls for two strokes of the machine for each total to be printed. The first stroke during its forward portion releases the carrying mechanisms of the several registers as usual and selects the register to be operated, its rearward portion being an idle movement of the operating racks. During the forward portion of the second stroke the racks are in gear with a register and take off its total, but the selecting mechanism must be stationary. This alternate motion and rest of the selecting mechanism is taken care of by the mechanism which is indicated as a whole at 292.

When the operator depresses the total key and turns the shaft 246 he unlocks this mechanism by withdrawing the pawl 1 through the connected link 289. This pawl is held withdrawn throughout the entire set of selecting operations necessary to complete the list, the total button being held down as above explained. The arms 285 and 286 are permitted to swing inwardly only upon the first, third and succeeding steps of the disks, being held outward from the disks on the alternate steps by means of a hook 2 which engages pins 3 similarly located on the two arms 285 and 286 in the path of the hook 2. The hook 2 is freely pivoted and is pulled downward by a spring 4. The hook, however, has a rear extension carrying a pin 5 adapted to be engaged by a shoulder on a stop arm 6 which, in the position shown, prevents the downward movement of the hook. On the same pivot with the hook 2 is an arm carrying a pin 7 adapted to be engaged to the under edge of the hook 2 and connected through a link 8 with an arm 9 on the shaft 1ᵃ which extends through to the part of the apparatus shown in Fig. 10 and carries there an arm 2ᵇ bearing on a cam 2ᵃ on the motor shaft 40, so that at each rotation of the motor shaft corresponding to each step of the machine, the shaft 1ᵃ is oscillated and with it a pin 7; so that, supposing the hook 2 to be free it would be raised and immediately dropped to hold the arms 285 and 286 for each step of the machine. Means are provided, however, for alternately withdrawing and restoring the stop 6 so as on the first of each pair of steps to hold up the hook 2 and on the second to leave the hook 2 free to drop. This alternating device consists of a pawl 3ᵃ on the oscillating piece 4ᵃ which carries the pin 7, the pawl being alternately forced outside of the pin 5ᵃ so as to carry the stop 6, and allowed to drop between the pins 5ᵃ and 6ᵃ to strike said stop and release the hook 2. The movements of the pawl are determined by a spring 7ᵃ which presses it inward and a link 8ᵃ connected to the pawl by a pin and slot and connected also to a lever 9ᵃ which is pivoted on the inner face of the lower part of the hook 2 and which is normally pressed outward by a strong spring 10ᵃ or thrown inward by the engagement of its lower end with a pin 11ᵃ mounted on the fixed part of the machine.

Supposing the parts in the position shown the next downward movement of the arm 9 and pin 7 will cause an upward movement of the pawl 3ᵃ and the end of the pawl will ride over the fixed pin 5ᵃ, the spring 7ᵃ forcing it inward the distance of the pin and slot connection to the link 8ᵃ. Thus upon an upward movement of the arm 9, causing a downward movement the pawl will pass between the pins 5ᵃ and 6ᵃ and will strike the stop 6 redrawing its shoulder in engagement with the pin 5ᵃ and allowing the hook 2 to move downward as soon as the arm 9 swings downward.

The downward movement of the hook 2, swinging the lower end of the hook outward from the fixed pin 11ᵃ, allows the strong spring 10ᵃ to press the link 8ᵃ outward, bringing the inner end of its slot against the pin on the pawl 3ᵃ and leaving room for a further movement of the link and pawl, which further movement takes place as soon as the downward movement of the hook 2 becomes sufficient to lift the pawl about the pin 5ᵃ. Whereupon, against the next upward movement of the hook the pawl will slide outside the pin 5ᵃ and the stop 6 will be pulled upward by its spring to engage the pin 5 and prevent operation of the hook 2, thus leaving the arms 285 and 286 free to operate, notwithstanding the downward movement of the pin 7.

The two total registers 180 and 181 of Fig. 3 are in frames fixed on shafts 293 and 294 respectively and are thrown into and out of gear by the turning down of these shafts. The selector for these two registers is a short sector 295, Fig. 13, having four notches on its periphery, and the shafts 293 and 294 carry arms 296 and 297 with flanges on their ends which in the regular registering operation of the machine drop into notches in the sector 295 and throw both registers into gear during each back stroke, so as to register the totals of all the individual registers. The sub-total button 240 is the one which is used ordinarily for printing a list of totals of the individual registers. When it is desired to have the total of all the amounts at present shown on the individual registers, which I call a sub-total, and the sum of this sub-total and previous sub-totals, I use a "grand total" button 298. When the sub-total button 240 is pressed it moves down two spaces and carries the sector 295 forward two spaces so that neither of the arms 296 and 297 can find a notch and so that both total registers are held out of gear during the listing. It will be understood that the machine when designed for taking both grand totals and sub-totals will have a modified form of connection with the shaft 246, as illustrated in Fig. 13, instead of the direct connection of Fig. 3. The connection between the push rod 242 and the sector is a detachable one, a hook 299 on the lower end of the rod being caught over a pin on the lower end of a link 300 connected with an arm of the sector. A link 301 is adapted when reciprocated to hook upon a pin 302 on the hook 299 and to draw the latter away from engagement with the link 300, the link 301 riding upon a pin 303 and being lifted from engagement with the pin 302 after the withdrawal of the hook 299. The link 301 normally rests in its left hand position engaging the pin 302. It is actuated by an arm on a shaft 304 which is connected, as shown in Fig. 11, to a link 305 operated by a swinging arm 306 pulled to the left by a spring 307 and having a nose projecting into the path of a pin 308 carried upon the disk 283 in such a position as to strike the arm 306 and withdraw the connection to the selecting sector 295 at the end of the listings of the successive registers whereupon the latter moves backward one step, limited by the pin 309 traveling in a slot in the link 300 and fastened on the push rod 242. The movement of the sector permits the arm 296 to drop into the first of the notches of the periphery of the sector and permits the printing of the sub-total.

To take off a grand total the button 298 is pressed downward three steps, positively advancing the sector 295 from the position illustrated to bring the third of its notches under the flange of the arm 297, so as to select the grand total register while holding the sub-total register out of gear.

It will be noted that, when using a selecting card of aluminum or paste board or the like, as above described that the information card will not be tabulated unless its classification number corresponds with that of the selecting card. A selecting card is to be left always in the machine and the selecting perforations in the information card which is to be tabulated or recorded must correspond with the controlled card. This constitutes a very simple and rapid method of controlling the selecting of the cards of which the information is to be distributed.

The registers or adding wheel sets have tripping and carrying mechanism self contained and removable with each wheel set. Each of the multiple wheel sets has an independent operating sector and carrying device connected therewith. This is a feature of great advantage in construction and in assembling of the machine and also permit the easy manufacture of machines of different capacities and the east extension or diminution of the capacity of a machine. The machine is a multiple movement machine, that is to say a complete series of operations is not performed in one stroke of the machine. This permits the machine to be driven from the usual high speed electric motor without too great a reduction in the gearing and at the same time allows ample time for the successive operations which take place in the machine. The several registers or wheel sets which are actuated for any given card operate simultaneously thus saving time and length of movement of the main shaft.

The sectors or disks or slides having combination shoulders for determining the several symbols or features constitute an extremely simple solution of the problem; as compared for example with the separate type bars used for the several symbols or letters in the perforated tape telegraphy.

A feature of first importance in reducing the cards to a comparative small size, or in making possible the carrying of a large amount of information upon a card of practicable size, is the representing of the various digits from 0 to 9 by combinations of less than 9 spaces on the card.

*Definitions.*—Though I have described with great particularity of detail certain specific embodiments of the invention, yet it is not to be understood therefrom that the invention is restricted to the particular embodiments thereof disclosed. For example, various combinations of adding, counting, or subtracting devices may be substituted for those shown and such mechanism may be indicating or non-indicating, recording or non-recording. The sectors and rings described may be complete or partial circles according to the intended capacity and design of the machine or may be replaced by members not moving in a circle. Various additions to the mechanism may also be made especially from the machines and combinations shown in my previous applications above referred to. The term "a machine of the class described" as used herein includes not only the entire machine but also separately the various unitary parts or sub-combinations of mechanisms described. The term "recording" is used to mean taking a number from a register in any way and impressing it upon a printing mechanism, upon another register or upon any other device.

A group or series or combination of perforations covers a single perforation as well as a plurality, except where a plurality is particularly specified. The term "slides" is not restricted to reciprocating rods, but applies equally to oscillating plates, rods or pins or other motion-transmitting devices. "Cards" include a continuous strip or the like.

What I claim is:

1. A machine of the class described having a card controlled master section, registers in other sections of the machine controlled from said master section, and a total register in said master section.

2. A machine of the class described having a card-controlled master section, registers in other sections of the machine controlled from said master section, and grand total and sub-total registers in said master section.

3. A machine of the class described having a card-controlled master section, registers in other sections of the machine controlled from said master section, total listing mechanism, and means in said master section for determining the feed of the paper of said total listing mechanism.

4. A machine of the class described having a card-controlled master section, registers in other sections of the machine controlled from said master section, and mechanism in said master section for controlling the recording of totals.

5. A machine of the class described having a number of registers arranged about an axis alongside of each other, parallel shafts for transmitting motion to the several registers respectively, arms located at both sides of an axis and movable under control of perforated cards and to different distances determinable by the perforations in the cards, and means for transmitting the movement of said arms to the respective shafts.

6. A machine of the class described having a card-controlled master section, means in said master section for actuating mechanism in the other sections, and recording mechanism in said master section.

7. A machine of the class described having a master section, an arm in said master section movable under control of a perforated card and carrying a part of a recording mechanism and serving also to actuate registering mechanism in another section.

8. A machine of the class described including in combination a sector controlling shaft and toggle mechanism for oscillating it.

9. A machine of the class described including in combination a card-controlled sector, a shaft also controlling said sector, toggle mechanism for oscillating said shaft, and a rotating shaft actuating said toggle.

10. A machine of the class described including in combination a controlling mechanism operated according to perforations in a card, actuating mechanism operating normally under control of said controlling mechanism, recording mechanism normally inoperative, and means for rendering said controlling mechanism inoperative and said recording mechanism operative.

11. A machine of the class described including in combination a card-controlled registering mechanism, a recording mechanism having a hammer which is inoperative during registering operations and means for rendering said hammer operative during a totaling operation.

12. A machine of the class described including in combination a card-controlled registering mechanism, a recording mechanism having paper-feeding means which are inoperative during registering operations, and means for rendering said means operative during a totaling operation.

13. A machine of the class described including in combination a number of card-controlled individual registers, a total register, and means for recording automatically in a predetermined order of succession the amounts of said individual registers and the total of such amount.

14. A machine of the class described including in combination a number of card-controlled individual registers, a total register and means for recording in automatic succession the amounts of said individual registers and the total of such amount and means for recording a grand total comprising the sum of the first mentioned total plus the total recorded in the previous operation of the machine.

15. A machine of the class described including in combination a number of card-controlled individual registers, a total register and means inoperative during the operation of the individual registers for recording the total amounts represented on said registers at any time.

16. A machine of the class described including in combination card-controlled individual registers, a sub-total register, a grand total register and means inoperative during the operation of the individual registers for recording the amount of either said sub-total register or said grand total register at will.

17. A machine of the class described including in combination a tub-total register, a grand total register, card-controlled means for simultaneously actuating both said registers and means inoperative during the operation of the individual registers for separately recording the amount of either at will.

18. A machine of the class described including in combination a sub-total register, a grand total register, card-controlled means for simultaneously actuating both said registers, means for rendering them both inoperative and rendering one or the other operative at will.

19. A machine of the class described including in combination means for feeding a card to operating position, a stop and means for automatically introducing said stop into position to be engaged by the card to limit said movement.

20. A machine of the class described having a forward and a backward stroke at each operation and including in combination feeling pins adapted to advance through holes in a card and means for causing an advance and a return movement of said pins and mechanism for advancing and withdrawing said means during a forward stroke of the machine.

21. A machine of the class described including in combination feeling pins adapted to advance through holes in a card, a plurality of slides for receiving the movement of said pins, and transmitting devices adapted to be alternatively rendered operative to transmit the movement of certain pins to their slides.

22. A machine of the class described including in combination feeling pins adapted to advance through holes in a card, a plurality of slides for receiving the movement of said pins, selecting devices controlled by said slides and transmitting devices adapted to be alternatively rendered operative to transmit the movement of certain pins to their slides.

23. A machine of the class described including in combination feeling pins adapted to advance through holes in a card, a plurality of slides for receiving the movement of said pins, levers for transmitting the movements of the respective pins to their corresponding slides, and means for shifting the pivots of said levers to render the latter operative or inoperative at will.

24. A machine of the class described including in combination feeling pins adapted to advance through holes in a card and having projections thereon and a movable controlling stop having slots, certain of said projections being adapted to pass through said slots in one position of the stop and certain others in another position of the stop.

25. In a machine of the class described, in combination, card-controlled registers, and selecting means adapted when in their zero positions or when advanced ten spaces to prevent the operation of any of the registers when the machine is operated without a card.

26. In a machine of the class described, card-controlled registers, selecting means adapted when in their zero positions to prevent the operation of the registers, and combination mechanism controlling the selecting means and preventing their advancement beyond the zero position when the machine is operated without a card.

27. In a machine of the class described, card-controlled registers, selecting means adapted when advanced ten spaces to prevent the operation of the registers, and combination mechanism controlling the selecting means and causing their advancement ten spaces when the machine is operated without a card.

28. A machine of the class described including in combination a plurality of registers, operating mechanism therefor controlled by perforated cards, a special selecting card and means coöperating therewith for selecting the register which will be operated by said operating mechanism.

29. A machine of the class described including in combination mechanism adapted to be controlled by any of a number of information cards, and a special selecting card adapted to control the operation in conjunction with such information cards.

30. A machine of the class described including in combination feeling pins adapted to move forward in various combinations, a perforated plate arranged to follow said pins only when they move forward in a certain combination and controlling means actuated by the movement of said plate.

31. A machine of the class described including in combination feeling pins adapted to move forward through holes punched in cards in corresponding combinations, a perforated plate arranged to follow said pins and punched in a combination which is the negative of a determined combination of the holes in a card, and controlling means actuated by the movement of said plate.

32. A machine of the class described including in combination feeling pins adapted to move forward in various combinations, a perforated plate arranged to follow said pins only when they move forward in a certain combination and locking means adapted to be withdrawn by a movement of said plate.

33. A machine of the class described including in combination feeling pins adapted to move forward through holes punched in cards in corresponding combinations, a series of plates punched in a series of negatives of determined combinations of the holes in the cards and adapted to be introduced into positions in line with said pins, means for pressing a plate so introduced in a direction to follow said pins, and controlling means actuated by a movement of said plate.

34. In a machine of the class described means for distributing into different classes information on perforated cards, in combination with locking apparatus for locking the machine into or out of operativeness for cards of a given classification substantially as illustrated and described.

35. In a machine of the class described in combination registers, card - controlled selecting mechanism, and locking apparatus for locking the machine into or out of operativeness for cards of a given classification, by suitably controlling the selecting mechanism when such cards are introduced.

36. In a machine of the class described in combination, pins adapted to enter holes in controlling cards, combs adjustably connected to the pins which enter holes in the cards and controlling the operation of the machine when a certain combination of pins is advanced and selecting mechanism for adjusting the connections of the entire group of combs simultaneously.

37. In a machine of the class described in combination, pins adapted to enter holes in controlling cards, combs adjustably connected to the pins which enter holes in the cards and controlling the operation of the machine when a certain combination of pins is advanced, and selecting mechanism for adjusting the connections of the combs, the combs being adapted to be freed from the pins and connected to the selecting mechanism and then freed from the selecting mechanism and connected in their adjusted positions to the pins.

38. In a machine of the class described in combination, pins adapted to enter holes in controlling cards, combs adjustably connected to the pins which enter holes in the cards and controlling the operation of the machine when a certain combination of pins is advanced and selecting mechanism for adjusting the connections of the entire group of combs simultaneously, said selecting mechanism comprising levers adapted for connection with the combs and sectors for swinging said levers in various combinations.

39. In a machine of the class described in combination, registers, card - controlled selecting mechanism, locking apparatus for locking the machine into or our of operativeness for cards of a given classification by suitably controlling the selecting mechanism when such cards are introduced and means for indicating the classification of such cards.

40. A machine of the class described including in combination registers, carriers therefor, and card-controlled means for selecting said registers and setting the carriers of only those registers which are selected in operative position and means for resetting in inoperative position the carrier of each selected register.

41. A machine of the class described including in combination registers, carriers for said registers, card - controlled mechanism for selecting said registers, a scalloped resetter for said carriers, an arm normally locked in position to hold said carriers inoperative and locked out of operative engagement with said resetter, and means actuated by the selection of a register for unlocking its said arm and permitting it to come into operative engagement with said resetter.

42. A machine of the class described having a series of non - indicating card - controlled registers for accumulating several numbers, and tabulating mechanism adapted to take totals off said registers.

43. A machine of the class described having a series of registers, extending around substantially a complete circle and controlling and actuating mechanism within said circle, said controlling mechanism being controllable by perforated cards.

In witness whereof, I have hereunto signed my name in the presence of two subscribing witnesses.

JOHN ROYDEN PEIRCE.

Witnesses:
D. ANTHONY USINA,
KENNETH B. HALSTEAD.

Copies of this patent may be obtained for five cents each, by addressing the "Commissioner of Patents, Washington, D. C."